Figure 1:
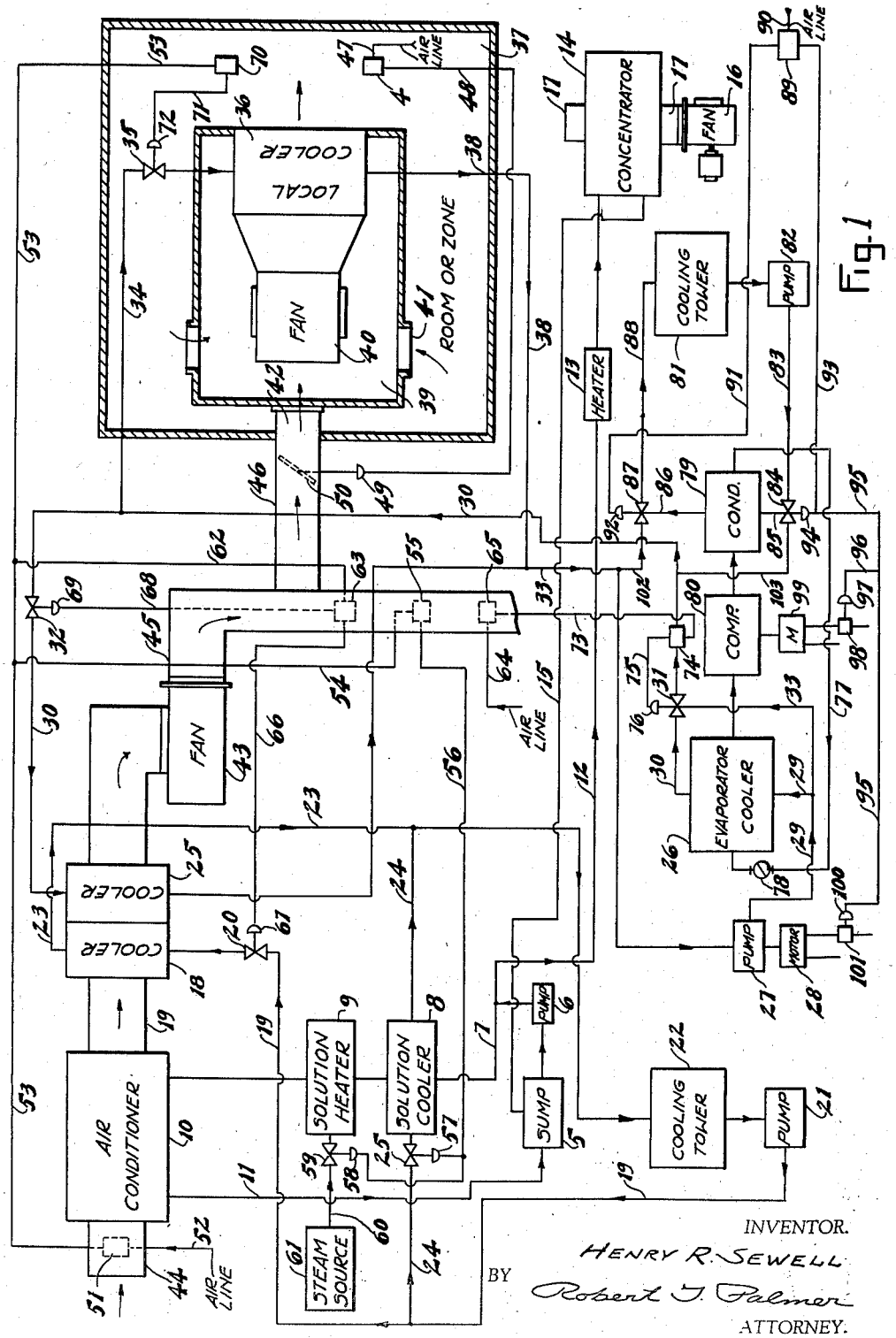

Sept. 30, 1941. H. R. SEWELL 2,257,485
AIR CONDITIONING SYSTEM
Filed Aug. 15, 1939 2 Sheets-Sheet 1

INVENTOR.
HENRY R. SEWELL
BY Robert T. Palmer
ATTORNEY.

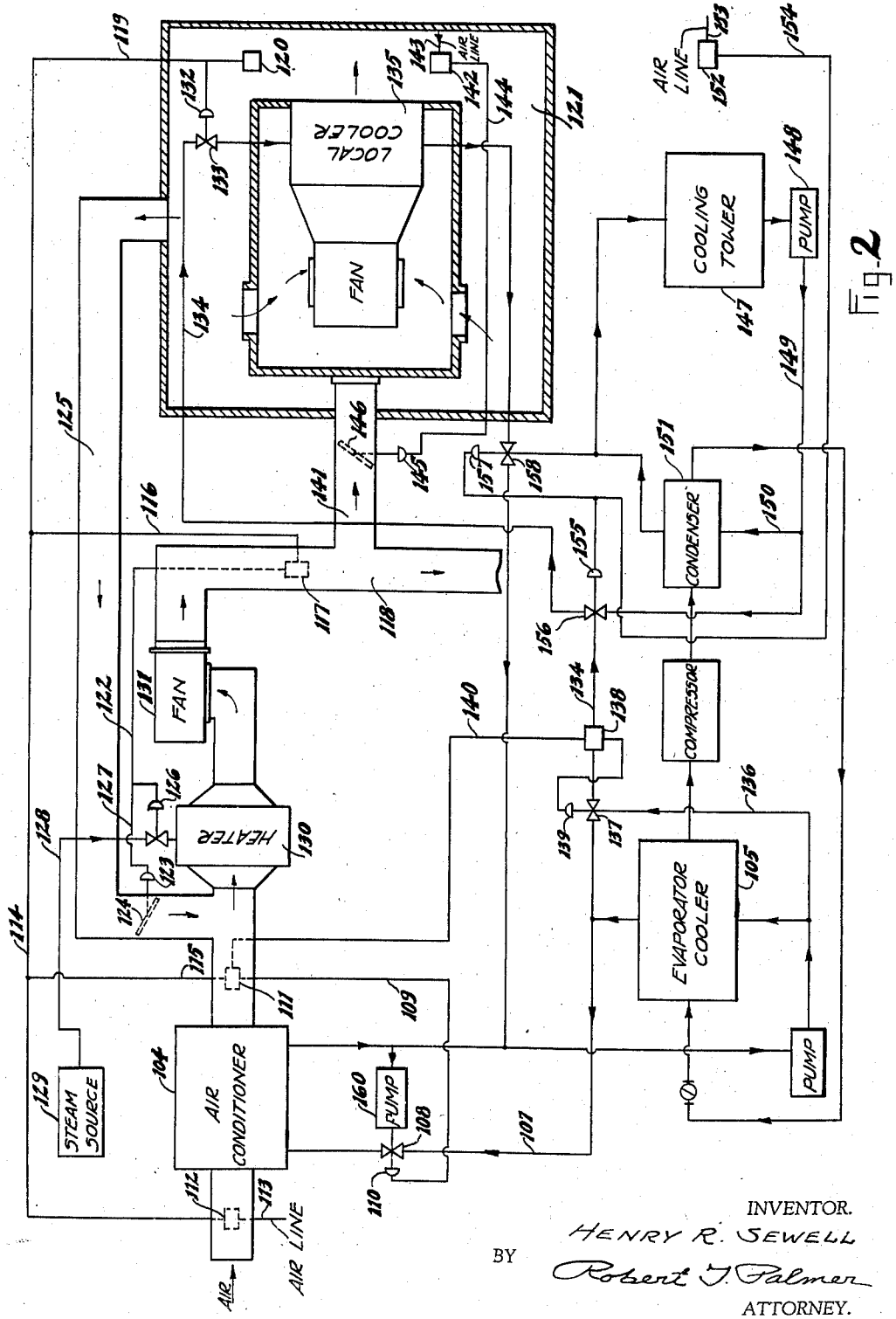

Patented Sept. 30, 1941

2,257,485

UNITED STATES PATENT OFFICE 2,257,485

AIR CONDITIONING SYSTEM

Henry R. Sewell, Norwell, Mass., assignor to B. F. Sturtevant Company, Hyde Park, Boston, Mass.

Application August 15, 1939, Serial No. 290,167

13 Claims. (Cl. 236—44)

This invention relates to the conditioning of air for comfort and relates more particularly to the combination of a central dehumidifier and local sensible coolers with controls for maintaining desired conditions of temperature and humidity at minimum expense.

In the past it has generally been the practice to dehumidify outdoor air and air recirculated from the space served, to a predetermined low dew point and after reheating the dehumidified air by mixture with by-pass air or by steam, to supply the mixed air into the space served. This has required not only large fans and large dehumidifiers for handling large volumes of air, but the supply ducts were large, and recirculated air and by-pass air ducts were required.

According to this invention dehumidified outdoor air is supplied to the space served, and sensible coolers in the space served take care of sensible heat gains in the space through recirculation of and the cooling of the air in the space.

A feature of the invention resides in varying the volume of dehumidified air supplied to the space served proportional to the moisture gains in the space thus meeting ventilating requirements by varying the volume of outdoor air conformably with the number of occupants of the space served.

Another feature of the invention resides in so adjusting the relation between the dew point temperature of the conditioned air and the temperature of the local sensible coolers that no condensation at the sensible coolers can take place.

In a preferred embodiment of the invention employing hygroscopic dehumidification this is accomplished by controlling the dew point of the air supplied into the space served, by controlling the vapor pressure of the absorbent solution, and by independently controlling the temperature of the cooling fluid supplied to the sensible coolers.

Another feature of the invention resides in varying the dew point temperature of the dehumidified air conformably with changes in the temperature of the outdoor air, so that the dew point temperature is raised when the outdoor temperature rises, and is lowered when the outdoor temperature falls.

Another feature of the invention resides in providing refrigerative water cooling in an after cooler and in the local sensible coolers when the wet bulb temperature of the outdoor air is too high for evaporative cooling to be effective, and in supplying this cooling effect through evaporative cooling when the wet bulb temperature of the outdoor air is sufficiently low.

An object of the invention is supplying conditioned outdoor air in volumes varying conformably with moisture gains and accordingly with ventilating requirements.

Another object is to remove sensible heat gains in a space supplied with dehumidified outdoor air, without providing condensation in the space.

Another object is controlling the operation of a central dehumidifier and local sensible coolers in accordance with changes in outdoor air conditions.

Another object of the invention is to control the dew point temperature of the air delivered by a hygroscopic dehumidifier by adjusting the vapor pressure of the hygroscopic solution employed.

Another object of the invention is to supply evaporatively cooled water to the after cooler of a hygroscopic air dehumidifier and to associated local sensible coolers.

Other objects of the invention will be apparent from the following description taken with the drawings.

The invention will now be described with reference to the drawings, of which:

Fig. 1 is a diagrammatic view of one embodiment of the invention employing hygroscopic dehumidification, and Fig. 2 is a diagrammatic view of another embodiment of the invention employing refrigerative dehumidification.

With reference to Fig. 1, a hygroscopic solution such, for example, as lithium chloride from the sump 5 is circulated by the pump 6 through the pipe 7 into the solution cooler 8 used in the cooling season, and then into the solution heater 9 used in the heating season and through the spray nozzles (not shown) in the air conditioner 10. The solution returns through the pipe 11 to the sump 5.

A portion of the solution drawn from the sump 5 by the pump 6 is by-passed through the pipe 12, through the heater 13 and concentrator 14 where excess moisture is evaporated, the concentrated solution returning through the pipe 15 to the sump 5. The fan 16 forces air through the duct 17 and concentrator 14 to aid in the evaporation.

The cooling tower water after cooler 18 is a sensible cooler receiving water through the pipe 19, valve 20 and pump 21 from the cooling tower 22. After passing through the cooler 18 the water returns through the pipe 23 to the cooling tower 22. A portion of the water from the cooling tower 22 is by-passed through the pipe 24 and valve 25 and solution cooler 8 following which it returns through the pipe 23 to the tower 22.

The evaporatively cooled water from the tower 22 removes sensible heat in the cooler 18 from the dehumidified air, and cools in the cooler 8 the absorption solution which has become heated in the conditioner 10.

The refrigerated water after cooler 25 is connected to the cooler 18 so as to receive air therefrom, and receives refrigerated water from the evaporator cooler 26, circulated by the pump 27 driven by the motor 28, through the pipes 29 and 30 and valves 31 and 32. The valve 31 is a three-way valve and is connected to the pipe 33 which forms a by-pass around the evaporator cooler 26 for the purpose which will presently be explained.

A portion of the refrigerated water from the evaporator cooler 26 passes from the pipe 30 through the pipe 34 and valve 35 and into the local cooler 36 in the room or zone 37. The water from the local cooler then passes through the pipes 38 and 33 back to the pump 27.

The local cooler 36 is an element of the local sensible cooler 39 which also has the fan 40, recirculated air inlets 41 and dehumidified air inlet 42. The sensible cooler 39 is one of several supplied with dehumidified outdoor air from the air conditioner 10, and recirculates the air within its room or zone 37 and mixes dehumidified outdoor air with the recirculated air in volume proportional to the occupants of the space 37 as will presently be explained.

The central fan 43 draws outdoor air through the ducts 44 and 19, air conditioner 10, and coolers 18 and 25 and supplies it through the main supply duct 45 and through branch ducts such as 46 into each of the rooms or zones 37, served.

The typical space 37 contains the humidostat 4 connected by the line 47 to a compressed air supply and controlling through the air line 48 and bell 49 the position of the damper 50 in the branch duct 46. As the moisture in the space varies above or below the desired standard, the humidostat 4 adjusts the damper 50 to admit more or less respectively, dehumidified air, through the duct 46 and inlet 42 into the local unit 39. The moisture gains vary with the occupants of the space 37 so that the damper 50 acts to vary the volume of outdoor air supplied in accordance with proper ventilating requirements.

The dry bulb master thermostat 51 in the outdoor air duct 44 is connected by the air line 52 to the compressed air supply and is connected by the air lines 53 and 54 to the wet bulb thermostat or hygrostat sub-stat 55 in the main supply duct 45. The sub-stat 55 is connected by the air line 56 to the bells 57 and 58 which control the vapor pressure of the absorption liquid circulated through the air conditioner by adjusting the valves 25 and 59 to vary its temperature.

The valve 59 is in the steam pipe 60 connecting the solution heater 9 with the steam source 61 which is in service during the heating season.

The wet bulb thermostat 55, it could alternatively be a humidostat, responds to changes in the humidity of the air in the main supply duct to maintain the desired standard by adjusting the vapor pressure of the absorption liquid and accordingly the dew point temperature of the air delivered by the conditioner 10. The thermostat 55 is adjusted by the master thermostat 51 conformably with changes in the dry bulb temperature of the outdoor air.

In prior systems especially those providing dehumidification by refrigeration, it was the practice to maintain a constant minimum dew point in the dehumidified air, and to vary the dry bulb temperature of the delivered air as required for comfort. This resulted in having to reheat air previously cooled by refrigeration, and in relatively great humidity fluctuations in the space served.

The present invention by raising the dew point of the dehumidified air above a selected minimum, conformably with rises in outdoor air temperatures, accomplishes several results. The cooling load is reduced and fluctuations in relative humidity are reduced. In addition as will be described in the following paragraph, the dry bulb temperature of the air delivered to the enclosure served, and the temperature of the sensible cooler in the enclosure are raised conformably with rises in the outdoor temperature. Thus comfort with minimum cost is obtained without danger of shocks due to excessive differences in indoor and outdoor temperatures.

The master thermostat is also connected by the air lines 53 and 62 with the dry bulb sub-stat 63 in the main air supply duct 45, and by the air line 53 with the dry bulb sub-stat 70 in the space 37, and resets these thermostats conformably with outdoor dry bulb temperature changes.

The thermostat 63 is connected by the air lines 66 to the bell 67 which adjusts the valve 20 in the water line 19 to the cooler 18, and by air line 68 to the bell 69 which adjusts the valve 32 in the water line 30 to the cooler 25. The thermostat 63 thus controls the dry bulb temperature of the air in the supply duct 45.

The thermostat 70 in the space 37 is connected by the air line 71 to the bell 72 which adjusts the valve 35 in the refrigerated water pipe to the local cooler 36, and controls the temperature of the air delivered by the local cooler, and adjusts the temperature of the air delivered by the local cooler conformably with outdoor temperature changes.

The dew point thermostat 65 in the main supply duct 45 is connected to the compressed air supply by the air line 64 and is connected by the air line 73 to the sub-stat 74 in the refrigerated water pipe 30. The sub-stat 74 is connected by the air line 75 to the bell 76 which adjusts the three-way valve 31. The sub-stat 74 controls the temperature of the refrigerated water through the pipe 30 to the central cooler 25 and local cooler 36 by adjusting the valve 31 to mix chilled water from the evaporator cooler 26 with recirculated water by-passed through the pipe 33 around the cooler 26. The sub-stat 74 is adjusted by the dew point thermostat 65 to control the temperature of the water supplied to the coolers 25 and 36 to prevent it having a temperature closely approaching the dew point temperature of the conditioned air. In this way no condensation can take place at the coolers 25 and 36.

The evaporator cooler 26 receives a volatile refrigerant through the pipe 77 and expansion valve 78, from the condenser 79 and compressor 80. The cooling tower 81 normally during refrigerating operation supplies water through the pump 82, pipe 83, valve 84 and pipe 85 to the condenser for cooling the condenser tubes. This water returns from the condenser to the tower 81, through the pip 86, valve 87 and pipe 88.

When the wet bulb temperature of the outdoor air is low enough for evaporative cooling to be effective, the wet bulb thermostat 89 which receives compressed air through the line 90, actuates the valve 87 through the bell 92 and air line 91 to close off the pipe 86 and to connect the pipe 102 with the pipe 88. It also actuates the valve 84 through the air line 93 and bell 94 to close off the pipe 85 and to connect the pipe 83 with the pipe 103. At the same time through the air lines 93, 95 and 96 it actuates the bell 97 to open the electric switch 98 to deenergize the compressor motor 99. At the same time through the air lines 93 and 95, it actuates the bell 100 to open the electric switch 101 to deenergize the pump motor 28.

The wet bulb thermostat 89 thus deenergizes the compressor 80 and the pump 27; discontinues the flow of water from the tower 81 through the condenser 79, and circulates the cooling tower water through the pipes 103 and 102 connecting with the pipes 30 and 33 respectively, through the central sensible cooler 25 and the local cooler 36 when the wet bulb temperature of the outdoor air falls to a predetermined point. When the wet bulb temperature of the outdoor air rises above the predetermined point, the thermostat 89 actuates the above described controls to energize the compressor 80 and pump 27 and to route the cooling tower water through the condenser 79 instead of into the sensible cooling water circuit.

The embodiment illustrated by Fig. 2 utilizes refrigeration for dehumidification and utilizes recirculated air as by-pass air for reheating the dehumidified air prior to discharge into the supply ducts. The central conditioner 104 is supplied with refrigerated water from the evaporator cooler 105 by the action of the pump 106, through the pipe 107 and valve 108. The valve 108 is a three-way valve and is controlled through the air line 109 and bell 110 by the duct thermostat 111 acting as a dew point control, to mix refrigerated water from the pipe 107 with water recirculated through the air conditioner 104 by the pump 160 for maintaining the desired dew point temperature.

The dry bulb thermostat 112 in the outdoor air inlet of the conditioner 104 receives compressed air through an air line 113 and is connected by the air lines 114 and 115 with the thermostat 111 which it adjusts conformably with changes in the temperature of the outdoor air.

The outdoor thermostat 112 is also connected by the air lines 114 and 116 with the dry bulb sub-stat 117 in the air supply duct 118, and by the air lines 114 and 119 with the dry bulb sub-stat 120 in the room or zone 121. It readjusts these sub-stats conformably with outdoor temperature changes.

The sub-stat 117 is connected by the air line 122 to the bell 123 which adjusts the damper 124 in the by-pass air duct 125. It is also connected by the air line 122 to the bell 126 which adjusts the valve 127 in the steam pipe 128 connecting the steam source 129 with the air heater 130 arranged between the conditioner 104 and the fan 131. The valve 127 is adapted to start opening when the damper 124 has been adjusted to full open position with the sub-stat 117 still calling for heat.

The sub-stat 120 controls through the bell 132 the valve 133 in the refrigerated water supply line 134 from the evaporator cooler 105 to the local cooler 135 for the space 121, and controls the temperature within the space 121 by controlling the volume of refrigerated water to the cooler 135.

The pipe 136 forms a water by-pass around the evaporator cooler 105 and connects with the three-way valve 137 in the refrigerated water line 134. The thermostat 138 in the refrigerated water line 134 adjusts through the bell 139, the valve 137 to control the mixture of refrigerated water from the cooler 105 with water by-passed around the cooler for maintaining a predetermined temperature of the water in the pipe 134.

The thermostat 138 is adjusted through the air line 140 by the thermostat 111 to maintain the temperature of the water supplied through the pipe 134 to the local cooler 135, above the dew point of the conditioned air supplied through the ducts 118 and 141 so no condensation of moisture can take place upon the surface of the cooler 135. As the dew point control is adjusted by the outdoor air thermostat's adjustment of the thermostat 111, it conformably adjusts the thermostat 138.

The humidostat 142 is connected by the air line 143 to compressed air and by the air line 144 to the bell 145 which adjusts the damper 146 in the duct 141. The humidostat adjusts the damper 146 to vary the volume of dehumidified air supplied to the space 121 conformably with the moisture gain therein which varies with the number of occupants.

The cooling tower 147 supplies cold water through the pump 148 and pipes 149 and 150, to the condenser 151 for cooling same. When the wet bulb temperature of the outdoor air is sufficiently low, the wet bulb thermostat 152 which is supplied with compressed air through the air line 153, adjusts through the air line 154 and bells 155 and 157, the three-way valves 156 and 158 respectively, to adjust the valves 156 and 158 to close off the flow of refrigerated water from the cooler 105 to the local cooler 135 and to connect the local cooler 135 to the cooling tower 147.

What is claimed is:

1. An air conditioning system for a room comprising in combination, a central dehumidifier, means for passing outdoor air through said dehumidifier and into said room, a sensible cooler in said room, means including a dew point control responsive to the dew point temperature of the air from said dehumidifier for adjusting in said dehumidifier the dew point of the air passing therethrough, supply means for supplying a cooling fluid to said cooler, and means responsive to changes in the temperature of the outdoor air entering said dehumidifier for adjusting said dew point control and said supply means for increasing the dew point temperature of the dehumidified air and for increasing the temperature of said fluid conformably with increases in the temperature of the outdoor air.

2. An air conditioning system for a room comprising in combination, means including a central dehumidifier for supplying dehumidified outdoor air into said room, a sensible cooler in said room, means supplying a cooling fluid to said cooler, means for increasing the dew point temperature of the air delivered by said dehumidifier conformably with increases in the outdoor temperature, and means responsive to humidity changes of the air in said room for varying the volume of dehumidified air supplied by said first mentioned means in the said room.

3. An air conditioning system for a room comprising in combination, a central dehumidifier for dehumidifying outdoor air, means including a duct for supplying air from said dehumidifier into said room, a local cooler in said room, cooling means for varying the temperature of said cooler, hygroscopic dehumidifying means for varying the dew point temperature of the air in said dehumidifier, cooling means for decreasing the temperature of the air leaving said dehumidifying means, means responsive to the dew point temperature of the air in said duct for adjusting said cooling means, volume control means for varying the volume of air delivered by said duct into said room, and means responsive to humidity changes in said room for adjusting said volume control means.

4. An air conditioning system for a room comprising in combination, a central dehumidifier for dehumidifying outdoor air, means including a duct for supplying air from said dehumidifier into said room, a local cooler in said room, cooling means for varying the temperature of said cooler, hygroscopic dehumidifying means for varying the dew point temperature of the air in said dehumidifier, cooling means for decreasing the temperature of the air leaving said dehumidifying means, means responsive to the dew point temperature of the air in said duct for adjusting said cooling means and means responsive to temperature increases in the outdoor air for adjusting said dew point temperature responsive means for increasing the temperature at which it responds.

5. An air conditioning system for a room comprising in combination, means including a central dehumidifier for supplying dehumidified outdoor air into said room, volume control means for varying the volume of outdoor air supplied by said dehumidifier into said room, a cooler in said room, means for varying the effectiveness of said cooler, means including a thermostat in said room for controlling said last mentioned means, means for adjusting said volume control means conformably with humidity changes in said room, and means responsive to outdoor air temperature changes for adjusting said thermostat for increasing the temperatures at which it responds conformably with increases in outdoor temperatures.

6. An air conditioning system for a room comprising in combination, a central dehumidifier for dehumidifying outdoor air, means including a duct connecting said dehumidifier and said room, means in said duct for varying the temperatures of the air delivered by said dehumidifier, a duct thermostat for controlling said last mentioned means, a cooler in said room, means for varying the effectiveness of said cooler, a room thermostat for controlling said last mentioned means, and an outdoor thermostat for adjusting said duct and room thermostats.

7. An air conditioning system for a room comprising in combination, a central dehumidifier for dehumidifying outdoor air, means for varying the dew point temperature of the air in said dehumidifier, means including a dew point thermostat responsive to the dew point temperature of the air delivered by said dehumidifier for controlling said means, means including a duct connecting said dehumidifier and said room, means in said duct for varying the dry bulb temperature of the air delivered by said dehumidifier, means including a duct thermostat for adjusting said last mentioned means, a local cooler in said room, means for varying the effectiveness of said cooler, means including a room thermostat for controlling said last mentioned means, and means including an outdoor thermostat connected to said dew point thermostat, said duct thermostat and said room thermostat for adjusting same for changes in outdoor temperature for increasing the temperatures at which they operate conformably with increases in the outdoor temperature.

8. An air conditioning system for a room comprising in combination, a central dehumidifier for dehumidifying outdoor air, means including a duct connecting said dehumidifier and room, means for varying the dew point temperature of the air in said dehumidifier, means including a duct thermostat for controlling said last mentioned means, means in said duct for varying the temperature of the air delivered by said dehumidifier, means including a second duct thermostat for controlling said last mentioned means, and means including an outdoor air thermostat for adjusting said duct thermostats for increasing the temperatures at which they operate, conformably with increases in the outdoor air temperature.

9. An air conditioning system for a room comprising in combination, a central dehumidifier for dehumidifying outdoor air, means including a duct connecting said dehumidifier and room, means for varying the dew point temperature of the air in said dehumidifier, means including a duct thermostat for controlling said last mentioned means, means in said duct for varying the temperature of the air delivered by said dehumidifier, means including a second duct thermostat for controlling said last mentioned means, a local cooler in said room, means for varying the effectiveness of said cooler, means including a room thermostat for controlling said last mentioned means, and means including an outdoor thermostat for adjusting said thermostats for increasing the temperatures at which they operate conformably with increases in the outdoor temperature.

10. An air conditioning system for a room comprising in combination, means including a hygroscopic dehumidifier for supplying dehumidified outdoor air into said room, an after cooler for cooling the dehumidified air delivered by said dehumidifier, a local cooler in said room, supply means for supplying refrigerated water to said coolers, means responsive to the dew point temperature of the air delivered by said dehumidifier for adjusting the temperature of the water supplied to said coolers by said supply means, means including a dry bulb thermostat exposed to the air delivered by said after cooler for adjusting the volume of water from said supply means to said after cooler, and means including a room thermostat for adjusting the volume of water from said supply means to said local cooler.

11. An air conditioning system for a room comprising in combination, a local cooler in said room, a hygroscopic dehumidifier for supplying dehumidified outdoor air into said room, an after cooler for cooling the dehumidified air, means including a duct for delivering the dehumidified cooled air into said room, means responsive to humidity changes in said duct for adjusting the dew point temperature of the air delivered by said dehumidifier, supply means for supplying cooling fluid to said coolers, and means responsive to increases in the dew point temperature of the air in said duct for adjusting said supply means for increasing the temperature of the fluid from said supply means to said coolers.

12. An air conditioning system for a room comprising in combination, a local cooler in said room, a hygroscopic dehumidifier for supplying dehumidified outdoor air into said room, an after cooler for cooling the dehumidified air, means including a duct for delivering the dehumidified cooled air into said room, means responsive to humidity changes in said duct for adjusting the dew point temperature of the air delivered by said dehumidifier, supply means for supplying cooling water to said coolers, means responsive to the dew point temperature of the air in said duct for adjusting said supply means, volume control means for varying the volume of dehumidified air supplied into said room, and means responsive to humidity changes in said room for adjusting said volume control means.

13. An air conditioning system for a room comprising in combination, a local cooler in said room, a hygroscopic dehumidifier for supplying dehumidified outdoor air into said room, an after cooler for cooling the dehumidified air, means including a duct for delivering the dehumidified cooled air into said room, means responsive to humidity changes in said duct for adjusting the dew point temperature of the air delivered by said dehumidifier, supply means for supplying cooling water to said coolers, means responsive to the dew point temperature of the air in said duct for adjusting the temperature of the water to said coolers from said supply means, means including a duct thermostat for varying the volume of water supplied to said after cooler, and means including a room thermostat for varying the volume of water supplied to said room cooler.

HENRY R. SEWELL.